United States Patent
Morimoto et al.

(10) Patent No.: US 8,661,827 B2
(45) Date of Patent: Mar. 4, 2014

(54) PLATES HAVING COOLING CHANNELS, AND METHOD FOR WELDING THE PLATES AND INCREASING A DIMENSION OF THE COOLING CHANNELS ADJACENT THE WELDED SECTION

(75) Inventors: Hitoshi Morimoto, Takasago (JP); Hidenori Kanki, Takasago (JP); Tatsuo Ishiguro, Takasago (JP); Hiroki Shibata, Takasago (JP); Tetsu Konishi, Takasago (JP); Kenji Sato, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1098 days.

(21) Appl. No.: 12/646,115

(22) Filed: Dec. 23, 2009

(65) Prior Publication Data

US 2011/0146284 A1 Jun. 23, 2011

(30) Foreign Application Priority Data

Apr. 30, 2009 (JP) ................................. 2009-110510

(51) Int. Cl.
*F02C 1/00* (2006.01)

(52) U.S. Cl.
USPC .............................................. 60/752; 29/463

(58) Field of Classification Search
USPC ........... 60/752, 754, 755, 756, 757, 758, 759, 60/760; 29/463, 525.14, 889.1, 889.2
See application file for complete search history.

(56) References Cited

U.S. PATENT DOCUMENTS

| | | | | |
|---|---|---|---|---|
| 3,572,031 A | * | 3/1971 | Szetela | ........................... 60/757 |
| 3,584,972 A | * | 6/1971 | Bratkovich et al. | ....... 416/229 R |
| 4,296,606 A | | 10/1981 | Reider | |
| 4,361,010 A | * | 11/1982 | Tanrikut et al. | ................. 60/757 |

(Continued)

FOREIGN PATENT DOCUMENTS

| CN | 1322276 A | 11/2001 |
|---|---|---|
| CN | 1464937 A | 12/2003 |

(Continued)

OTHER PUBLICATIONS

International Search Report of PCT/JP2009/070988 mailing date of Mar. 30, 2010.

(Continued)

*Primary Examiner* — Phutthiwat Wongwian
*Assistant Examiner* — Michael B Mantyla
(74) *Attorney, Agent, or Firm* — Westerman, Hattori, Daniels & Adrian, LLP

(57) ABSTRACT

A plate-like-object manufacturing method, plate-like objects, a gas-turbine combustor, and a gas turbine, in which degradation in the cooling performance can be suppressed, the time required for manufacturing a gas-turbine combustor can be shortened, and deterioration of the working environment can be prevented are provided. A plate-like-object manufacturing method includes a step of forming a plate-like object by stacking a plurality of plates and arranging a plurality of channels, through which a cooling medium flows, side-by-side between the plurality of plates; and a step of arranging a plurality of the plate-like objects side-by-side in a direction in which the channels are arranged, butting the plurality of plate-like objects against each other, and performing welding at an abutment section. The channels adjacent to the abutment section extend along the abutment section and have a greater dimension in the direction in which the channels are arranged, as compared with that of other channels.

8 Claims, 7 Drawing Sheets

(56) References Cited

U.S. PATENT DOCUMENTS

| | | | |
|---|---|---|---|
| 5,221,045 A | 6/1993 | McAninch et al. | |
| 5,590,531 A * | 1/1997 | Desaulty et al. | 60/752 |
| 5,647,202 A * | 7/1997 | Althaus | 60/266 |
| 5,724,816 A * | 3/1998 | Ritter et al. | 60/752 |
| 5,933,699 A * | 8/1999 | Ritter et al. | 419/6 |
| 6,282,905 B1 * | 9/2001 | Sato et al. | 60/752 |
| 6,467,253 B1 | 10/2002 | Haggander | |
| 6,553,766 B2 * | 4/2003 | Shimizu et al. | 60/752 |
| 6,761,031 B2 * | 7/2004 | Bunker | 60/752 |
| 6,901,758 B2 * | 6/2005 | Grady et al. | 60/752 |
| 6,966,188 B2 | 11/2005 | Hirota et al. | |
| 2001/0027653 A1 * | 10/2001 | Mandai et al. | 60/757 |
| 2004/0020212 A1 | 2/2004 | Hirota et al. | |
| 2007/0180828 A1 * | 8/2007 | Webb | 60/752 |

FOREIGN PATENT DOCUMENTS

| | | |
|---|---|---|
| CN | 1498277 A | 5/2004 |
| CN | 101025091 A | 8/2007 |
| JP | 62-150543 U | 9/1987 |
| JP | 7-27335 A | 1/1995 |
| JP | 10-76335 A | 3/1998 |
| JP | 3192690 B2 | 7/2001 |
| JP | 2002-531748 A | 9/2002 |
| JP | 2003-56358 A | 2/2003 |
| JP | 2006-90302 A | 4/2006 |
| JP | 3831638 B2 | 10/2006 |
| JP | 2008-531961 A | 8/2008 |
| JP | 2008-200836 A | 9/2008 |

OTHER PUBLICATIONS

Decision to Grant a Patent dated Apr. 9, 2013, issued in corresponding Japanese Patent Application No. 2009-110510, with English translation (6 pages).

Chinese Office Action dated Apr. 3, 2013, issued in corresponding Chinese Patent Application No. 200980147740.5, w/ English translation.

Chinese Office Action dated Nov. 15, 2013 (issuing date), issued in corresponding Chinese Patent Application No. 200980147740.5 with English translation (16 pages).

* cited by examiner

PLATES HAVING COOLING CHANNELS, AND METHOD FOR WELDING THE PLATES AND INCREASING A DIMENSION OF THE COOLING CHANNELS ADJACENT THE WELDED SECTION

BACKGROUND OF THE INVENTION

1. Field of the Invention

The present invention relates to plate-like-object manufacturing methods, plate-like objects, gas-turbine combustors, and gas turbines.

This application is based on Japanese Patent Application No. 2009-110510, the content of which is incorporated herein by reference.

2. Description of Related Art

Plate-like objects having channels, through which a cooling medium flows, formed between both surfaces thereof are used as components for areas exposed to high-temperature environments in gas-turbine combustors, jet engines, space-related devices and the like. Because plate-like objects are cooled by causing the cooling medium to flow through the channels, plate-like objects can be used in the aforementioned areas that are exposed to high-temperature environments.

For example, because combustion cylinders in gas-turbine combustors are used in a high-temperature environment of about 1500° C., combustion cylinders are formed by using the aforementioned plate-like objects having a cooling function (for example, see the Publication of Japanese Patent No. 3192690).

Specifically, a single cylindrical combustion cylinder is formed by joining and assembling together a plurality of (e.g., four) plate-like objects. A known joining method, such as laser welding, is used for joining together neighboring plate-like objects (for example, see the Publication of Japanese Patent No. 3831638).

However, when joining the neighboring plate-like objects together in the above-described manner, if channels through which a cooling medium flows are open at the joint surfaces, the openings may get blocked as a result of welding, making it impossible for the cooling medium to flow through those channels.

The occurrence of such channels without the cooling medium flowing therethrough is a problem in that the cooling performance may vary among the plate-like objects and that the cooling performance may become degraded.

In light of this, a technology for causing the cooling medium to flow through the aforementioned channels by welding together the neighboring plate-like objects, forming grooves along the welded sections by partially cutting the welded sections, and connecting the blocked openings and the grooves is proposed.

Note that the aforementioned grooves are closed by covering them with a cover.

However, in the method of forming the grooves and closing them with a cover, as described above, it is necessary to provide the grooves by machining, such as grinding, after performing welding using a laser or the like, which is a problem in that dust is produced during the machining process, leading to deterioration of the working environment.

In addition, cracks may sometimes form when the welded sections and the grooves interfere with each other, and in that case, it is necessary to check whether or not there is a crack by performing inspection, such as X-ray imaging, after the welding process. If a crack is found, it is necessary to perform many readjustments, such as mending the crack, resulting in a problem in that the period required for manufacturing a turbine combustor is extended.

On the other hand, since the shape of the grooves varies depending on individual turbine combustors, the cover that covers the grooves needs to be fabricated in accordance with the actual shape of the grooves, resulting in a problem in that the period required for manufacturing a turbine combustor is extended.

BRIEF SUMMARY OF THE INVENTION

The present invention has been made to solve the aforementioned problems, and an object thereof is to provide a plate-like-object manufacturing method, plate-like objects, a gas-turbine combustor, and a gas turbine, in which degradation in the cooling performance can be suppressed, the time required for manufacturing the gas-turbine combustor can be shortened, and deterioration of the working environment can be prevented.

In order to achieve the aforementioned object, the present invention provides the following solutions.

A plate-like-object manufacturing method according to a first aspect of the present invention includes a step of forming a plate-like object by stacking a plurality of plates and arranging a plurality of channels, through which a cooling medium flows, side-by-side between the plurality of plates; and a step of arranging a plurality of the plate-like objects side-by-side in a direction in which the channels are arranged, butting the plurality of plate-like objects against each other, and performing welding at an abutment section, and the channels adjacent to the abutment section extend along the abutment section and have a greater dimension in the direction in which the channels are arranged, as compared with that of other channels.

With the first aspect, by increasing the width dimension of the channels adjacent to the abutment section, that is, the dimension in the direction in which the channels are arranged, degradation in the cooling performance in the plate-like objects welded at the abutment section can be suppressed.

Specifically, by making the width dimension of the channels in the vicinity of the abutment section greater than the width dimension of the other channels, the cooling performance achieved by the channels in the vicinity of the abutment section becomes higher than the cooling performance achieved by the other channels. Therefore, by disposing the channels with the greater width dimension adjacent to the abutment section where the cooling performance tends to deteriorate because of the inability to dispose channels in the vicinity thereof, degradation in the cooling performance in the vicinity of the abutment section of the plate-like objects can be suppressed.

Furthermore, since the channels adjacent to the abutment section extend along the abutment section, the channels are prevented from being blocked even if the neighboring plate-like objects are welded at the abutment section, thereby eliminating the need for forming grooves by machining a welded section of the neighboring plate-like objects, for example, by cutting the welded section by grinding, as in the invention set forth in Patent Literature 2. Therefore, the time required for manufacturing a gas-turbine combustor by using the plate-like objects can be shortened, and deterioration of the working environment can be prevented.

In the first aspect, it is desirable that the step of forming the plate-like object include a step of forming a plurality of grooves side-by-side in one surface of one plate, and a step of forming the plate-like object and the plurality of channels by joining another plate to the one surface of the one plate.

With the first aspect, the plate-like objects having the channels are each formed by joining the other plate to the one plate, after forming the grooves in the one plate, so as to block the openings of the grooves by using the other plate.

Therefore, the groove width, which is a groove dimension in a direction in which the grooves are arranged, becomes the width dimension of the channels, thereby allowing for easy adjustment of the channel-width dimension. Likewise, the groove depth, which is a groove dimension in the thickness direction of the one plate, becomes the depth dimension of the channels, thereby allowing for easy adjustment of the channel-depth dimension.

In the first aspect, it is desirable that the step of forming the plate-like object include a step of forming a plurality of slits side-by-side in a first plate, and a step of forming the plate-like object and the plurality of channels by joining second plates to one surface and another surface of the first plate.

With the first aspect, the plate-like objects having the plurality of channels are each formed by forming the plurality of slits side-by-side in a comb-teeth pattern in the first plate and joining two second plates thereto with the first plate sandwiched therebetween.

Therefore, the slit width, which is a width dimension in a direction in which the slits are arranged, becomes the width dimension of the channels, thereby allowing for easy adjustment of the channel-width dimension. Likewise, the thickness of the first plate becomes the depth dimension of the channels, thereby allowing for easy adjustment of the channel-depth dimension.

Plate-like objects according to a second aspect of the present invention include one plate-like object having a plurality of channels arranged side-by-side therein; another plate-like object having a plurality of channels arranged side-by-side therein, the plurality of channels being arranged side-by-side in one direction relative to the one plate-like object; and a welded section at which the one plate-like object and the other plate-like object are joined together, and the channels adjacent to the welded section for the one plate-like object and the other plate-like object and extending along the welded section have a greater dimension in the direction in which the channels are arranged, as compared with that of other channels.

With the second aspect, by increasing the width dimension of the channels adjacent to the welded section, that is, the dimension in the direction in which the channels are arranged, degradation in the cooling performance in the plate-like objects welded at the welded section can be suppressed.

Specifically, by making the width dimension of the channels in the vicinity of the welded section greater than the width dimension of the other channels, the cooling performance achieved by the channels in the vicinity of the welded section becomes higher than the cooling performance achieved by the other channels. Therefore, by disposing the channels with the greater width dimension adjacent to the welded section where the cooling performance tends to deteriorate because of the inability to dispose channels in the vicinity thereof, degradation in the cooling performance in the vicinity of the welded section of the plate-like objects can be suppressed.

Furthermore, since the channels adjacent to the welded section extend along the welded section, the channels are prevented from being blocked even if the neighboring plate-like objects are welded at the welded section, thereby eliminating the need for forming grooves by machining the welded section of the neighboring plate-like objects, for example, by cutting the welded section by grinding, as in the invention set forth in the Publication of Japanese Patent No. 3831638.

Therefore, the time required for manufacturing a gas-turbine combustor by using the plate-like objects can be shortened, and deterioration of the working environment can be prevented.

A gas-turbine combustor according to a third aspect of the present invention includes a nozzle unit that emits fuel; and a cylindrical object that mixes and combusts air and the emitted fuel therein, and the cylindrical object includes the plate-like objects manufactured by the plate-like-object manufacturing method according to the first aspect of the present invention or the plate-like objects according to the second aspect of the present invention.

With the third aspect, since the cylindrical object is formed by using the plate-like objects manufactured by the plate-like-object manufacturing method according to the first aspect of the present invention or the plate-like objects according to the second aspect of the present invention, degradation in the cooling performance in the cylindrical object can be suppressed. In addition, the time required for manufacturing the gas-turbine combustor can be shortened, and deterioration of the working environment can be prevented.

A gas turbine according to a fourth aspect of the present invention includes a compressor that compresses air; the gas-turbine combustor according to the third aspect that produces combustion gas by mixing and combusting compressed air supplied from the compressor and fuel supplied from the outside; a turbine unit that converts a portion of energy included in the combustion gas into a rotational driving force; and a rotating shaft that transmits the rotational driving force from the turbine unit to the compressor.

With the fourth aspect, by using the gas-turbine combustor of the present invention, degradation in the cooling performance in the gas-turbine combustor can be suppressed, the time required for manufacturing the gas-turbine combustor can be shortened, and deterioration of the working environment can be prevented.

With the plate-like-object manufacturing method, the plate-like objects, the gas-turbine combustor, and the gas turbine of the present invention, the width dimension of the channels adjacent to the abutment section, that is, the dimension in the direction in which the channels are arranged, is increased, thereby advantageously suppressing degradation in the cooling performance in the plate-like objects welded at the abutment section, shortening the time required for manufacturing the gas-turbine combustor, and preventing deterioration of the working environment.

DETAILED DESCRIPTION OF THE INVENTION

First Embodiment

A gas turbine according to a first embodiment of the present invention will be described below with reference to FIGS. 1 to 7.

Figure 1:
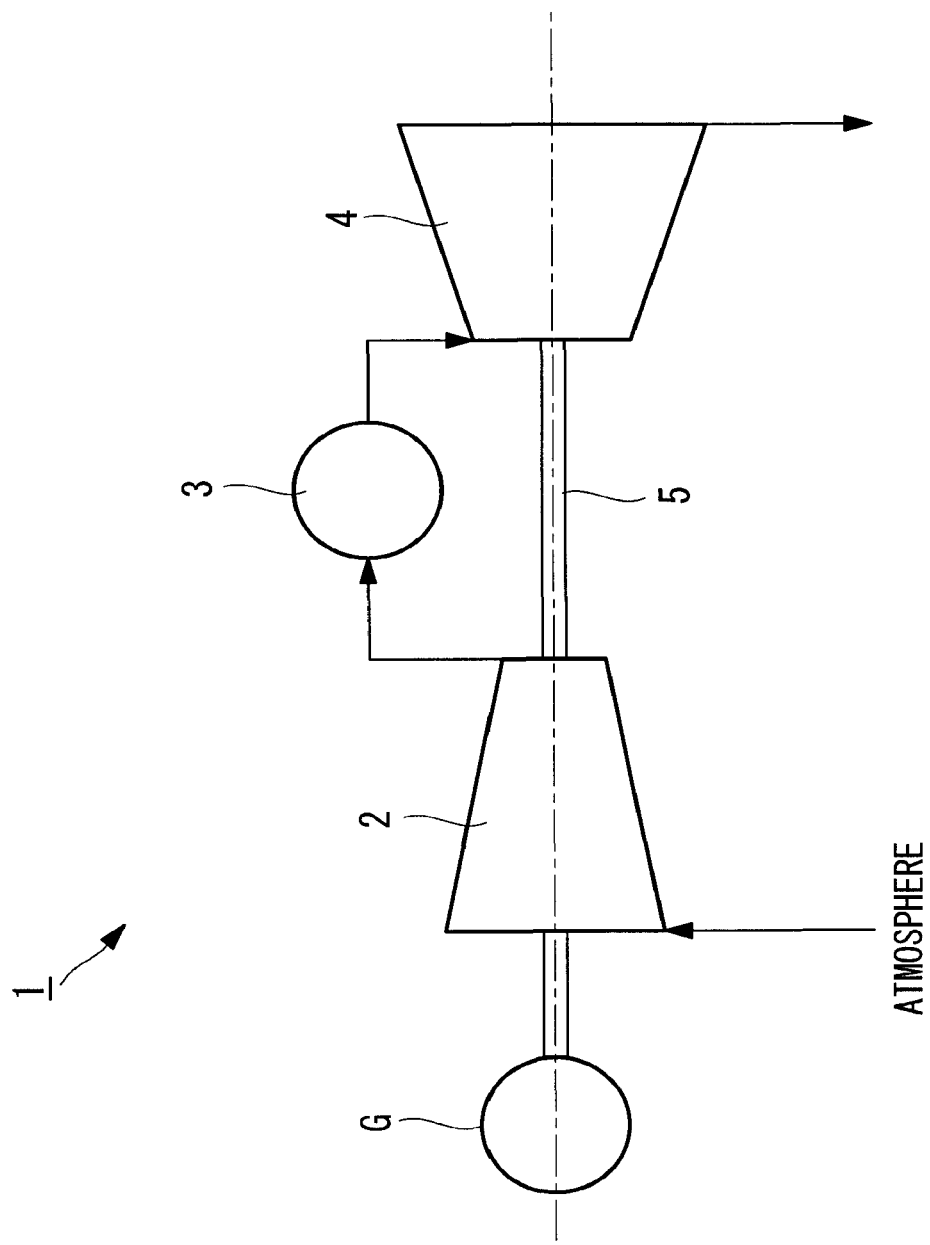
FIG. 1 is a schematic diagram for explaining the configuration of a gas turbine according to a first embodiment of the present invention.

FIG. 1 is a schematic diagram for explaining the configuration of the gas turbine according to this embodiment.

Although a gas turbine 1 of the present invention is described as being applied to a type that drives a generator G in this embodiment, as shown in FIG. 1, the target object to be driven by the gas turbine 1 is not limited to a generator G and may be other devices; it is not limited in particular.

As shown in FIG. 1, the gas turbine 1 is mainly provided with a compressor 2, a combustor (gas-turbine combustor) 3, a turbine unit 4, and a rotating shaft 5.

The compressor 2 takes in and compresses the atmosphere, i.e., the external air, and supplies the compressed air to the combustor 3.

As shown in FIG. 1, the compressor 2 is provided with an inlet guide vane that adjusts the flow rate of the atmosphere flowing into the compressor 2, single-stage rotor blades that compress the atmosphere flowing therein, single-stage stator blades, and the like.

Figure 2:
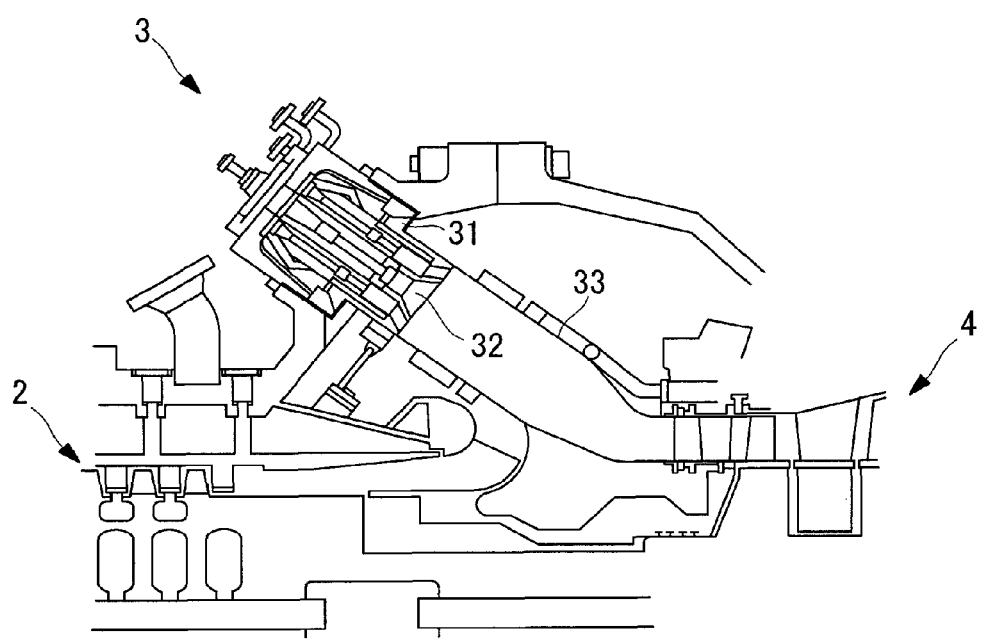
FIG. 2 is a schematic diagram for explaining the configuration of a compressor, a turbine unit, and a combustor in FIG. 1.

FIG. 2 is a schematic diagram for explaining the configuration of a compressor, a turbine unit, and a combustor in FIG. 1.

As shown in FIGS. 1 and 2, the combustor 3 mixes the air compressed by the compressor 2 with fuel supplied from the outside and combusts the mixture so as to produce high-temperature gas (combustion gas).

As shown in FIG. 2, the combustor 3 is mainly provided with an air inlet 31, a nozzle unit 32, and a combustion cylinder (i.e., a cylindrical object or plate-like objects) 33.

As shown in FIG. 2, the air inlet 31 introduces the air compressed by the compressor 2 into the combustion cylinder 33 and is disposed annularly around the nozzle unit 32. Moreover, the air inlet 31 gives a flow-velocity component in a circulating direction to the air flowing into the combustion cylinder 33 and forms a circulating flow inside the combustion cylinder 33.

The air inlet 31 may have a known shape, but is not particularly limited.

As shown in FIG. 2, the nozzle unit 32 sprays externally-supplied fuel into the combustion cylinder 33. The fuel sprayed from the nozzle unit 32 is stirred by, for example, the flow of air formed by the air inlet 31, thereby becoming an air-fuel mixture.

The nozzle unit 32 may have a known shape, but is not particularly limited.

Figure 3:
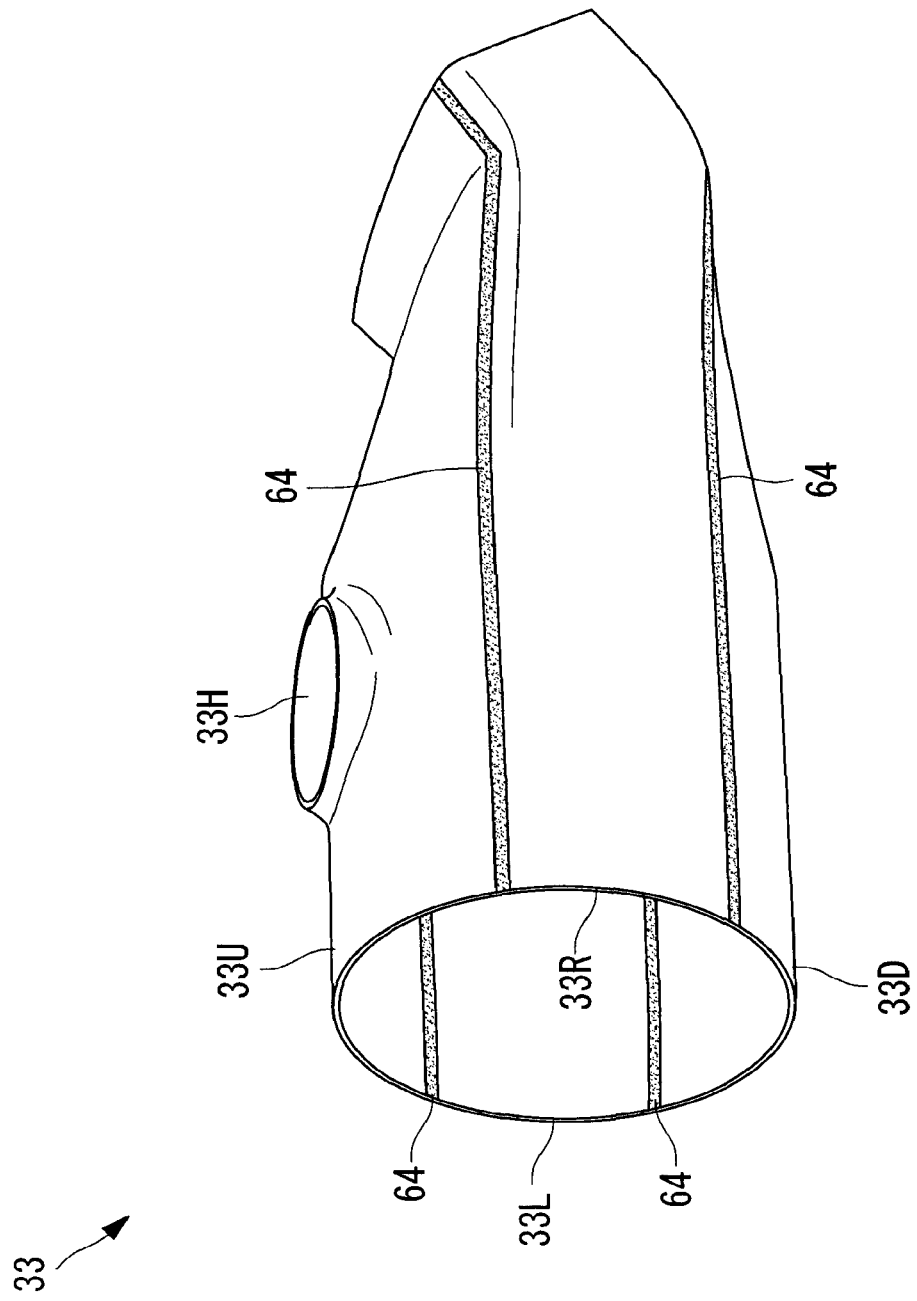
FIG. 3 is a perspective view for explaining the configuration of a combustion cylinder in FIG. 2.

FIG. 3 is a perspective view for explaining the configuration of the combustion cylinder in FIG. 2.

As shown in FIGS. 2 and 3, the combustion cylinder 3 forms a channel that extends from the air inlet 31 and the nozzle unit 32 towards an inflow section of the turbine unit 4. In other words, the combustion cylinder 33 causes the air-fuel mixture and high-temperature gas produced by the combustion of the mixture to flow therein.

The combustion cylinder 33 is a cylindrical component whose cross section at the nozzle unit 32 side is formed in a circular shape and whose cross section at the turbine unit 4 side is formed in a rectangular shape and having a cross-sectional shape that changes continuously from the nozzle unit 32 towards the turbine unit 4.

Figure 4:
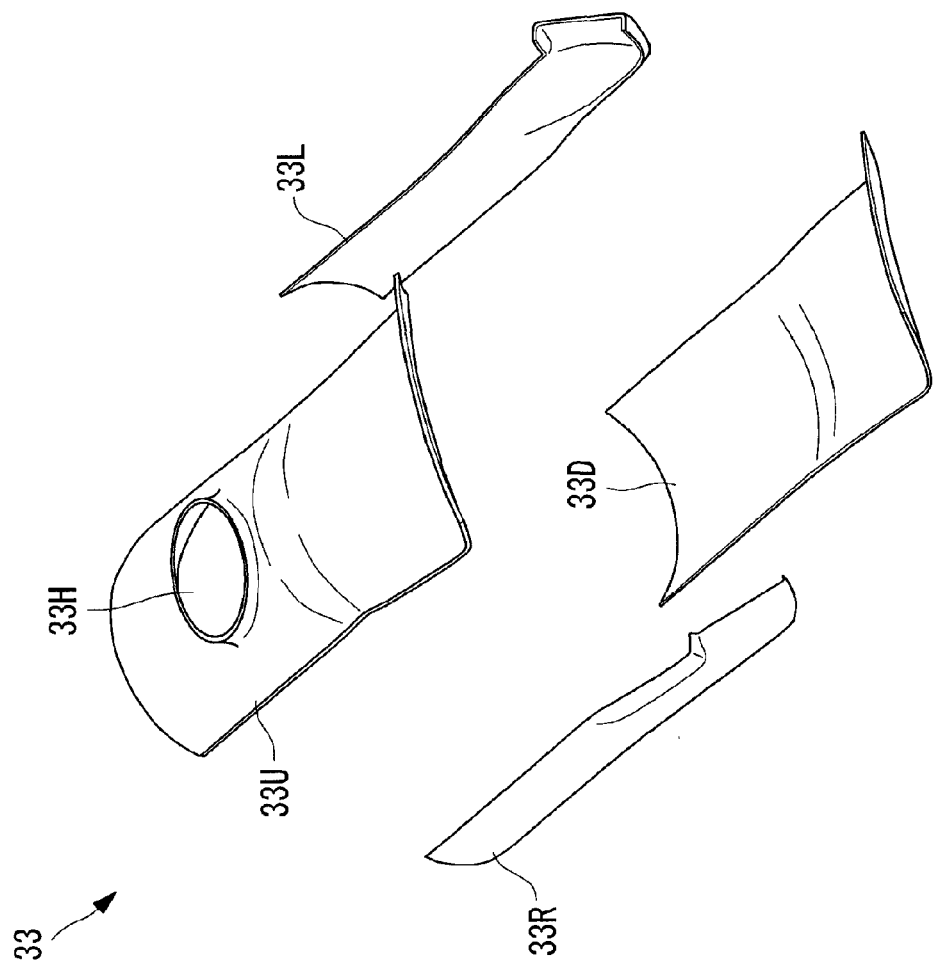
FIG. 4 is an exploded view for explaining the configuration of plate-like objects that constitute the combustion cylinder in FIG. 3.

FIG. 4 is an exploded view for explaining the configuration of panels that constitute the combustion cylinder in FIG. 3.

As shown in FIGS. 3 and 4, the combustion cylinder 33 is constituted of an upper panel (plate-like object) 33U, a lower panel (plate-like object) 33D, a right panel (plate-like object) 33R, and a left panel (plate-like object) 33L.

The upper panel 33U is one of the plate-like members obtained by dividing the combustion cylinder 33 into four parts in the circumferential direction and defines an upper side surface of the combustion cylinder 33, or in other words, an outer side surface in the radial direction when the combustor 3 is disposed in the gas turbine 1.

A through-hole 33H that communicates with a bypass valve (not shown) is formed in the middle of the upper panel 33U.

The lower panel 33D is another one of the plate-like members obtained by dividing the combustion cylinder 33 into four parts in the circumferential direction and defines a lower side surface of the combustion cylinder 33, or in other words, an inner side surface in the radial direction when the combustor 3 is disposed in the gas turbine 1.

The right panel 33R is another one of the plate-like members obtained by dividing the combustion cylinder 33 into four parts in the circumferential direction and defines a right side surface of the combustion cylinder 33, or in other words, a right side surface from the compressor 2 towards the turbine unit 4 when the combustor 3 is disposed in the gas turbine 1.

The left panel 33L is another one of the plate-like members obtained by dividing the combustion cylinder 33 into four parts in the circumferential direction and defines a left side surface of the combustion cylinder 33, or in other words, a left side surface from the compressor 2 towards the turbine unit 4 when the combustor 3 is disposed in the gas turbine 1.

Specifically, in order to form the combustion cylinder 33 whose cross section at the nozzle unit 32 side is formed in a circular shape and whose cross section at the turbine unit 4 side is formed in a rectangular shape, the cross sections thereof at the nozzle unit 32 side of the upper panel 33U, the lower panel 33D, the right panel 33R, and the left panel 33L are formed in a circular-arc shape and the cross sections at the turbine unit 4 side thereof are formed in a linear shape.

Furthermore, the upper panel 33U, the lower panel 33D, the right panel 33R, and the left panel 33L described above are connected to each other by laser welding so as to form the combustion cylinder 33.

Specifically, the neighboring right panel 33R and the neighboring left panel 33L are laser-welded to the upper panel 33U, and the neighboring right panel 33R and the neighboring left panel 33L are laser-welded to the lower panel 33D.

Figure 5:
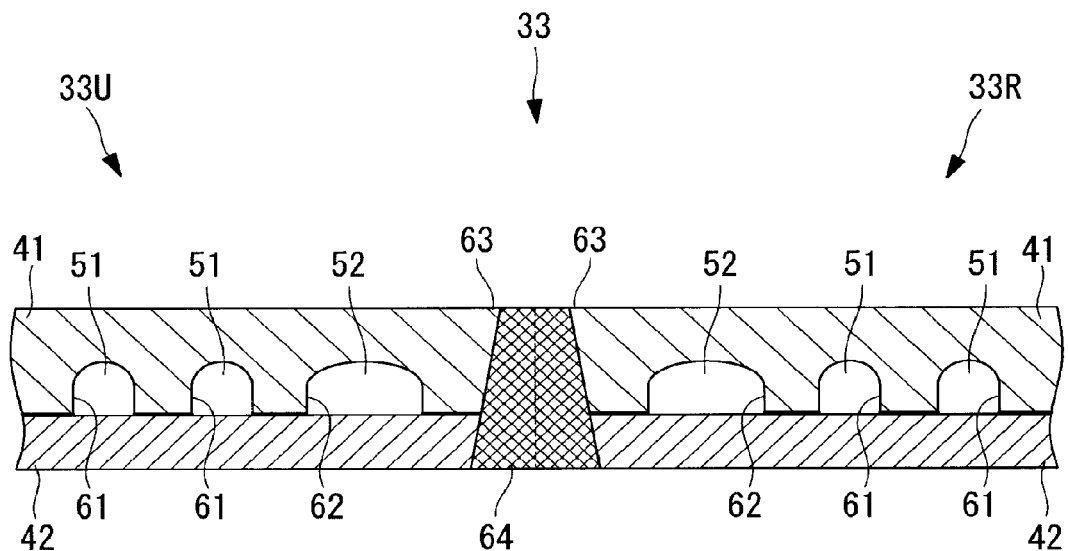
FIG. 5 is a cross-sectional view for explaining the configuration in the combustion cylinder in FIG. 3.

FIG. 5 is a cross-sectional view for explaining the configuration in the combustion cylinder in FIG. 3.

The upper panel 33U, the lower panel 33D, the right panel 33R, and the left panel 33L have the same basic configuration, and moreover, the welded section between the upper panel 33U and the right panel 33R, the welded section between the right panel 33R and the lower panel 33D, the welded section between the lower panel 33D and the left panel 33L, and the welded section between the left panel 33L and the upper panel 33U have the same basic configuration.

Therefore, the description here will be directed only to the configuration of the upper panel 33U and the right panel 33R and to the welded section between the upper panel 33U and the right panel 33R with reference to FIG. 5, and descriptions regarding the configuration of the lower panel 33D and the left panel 33L, the welded section between the right panel 33R and the lower panel 33D, and the like will be omitted.

As shown in FIG. 5, the upper panel 33U and the right panel 33R are each provided with an outer plate (one plate) 41 and an inner plate (another plate) 42.

The outer plate 41 is a plate-like component disposed on the outer peripheral side of the combustion cylinder 33, and is composed of metal, an alloy, or the like having heat-resisting properties. The present embodiment is described as being applied to an example where the outer plate 41 is composed of a nickel-based alloy.

First grooves (grooves) 61 and second grooves (grooves) 62 that respectively form first channels (channels) 51 and second channels (channels) 52, through which a cooling medium, such as vapor, flows, are formed side-by-side in a surface of the outer plate 41 that faces the inner plate 42.

Furthermore, in the outer plate 41 constituting the upper panel 33U, areas thereof that face the neighboring right panel 33R and the neighboring left panel 33L are provided with abutment sections 63.

Abutment sections 63 are similarly provided in areas, which face the neighboring upper panel 33U and the neighboring lower panel 33D, of the outer plates 41 constituting the right panel 33R and the left panel 33L, as well as in areas, which face the neighboring right panel 33R and the neighboring left panel 33L, of the outer plate 41 constituting the lower panel 33D.

Of the plurality of grooves formed side-by-side in each outer plate 41, a first groove 61 is a groove that is disposed on the inner side other than both ends, or in other words, a groove with a first groove or grooves 61 or a second groove 62 disposed on both sides of that groove.

In the cross-sectional view of FIG. 5, the first grooves 61 are grooves with a circular-arc-shaped bottom and having a smaller groove-width, which is a dimension in the direction in which the first grooves 61 and the second grooves 62 are arranged (left-right direction in FIG. 5), as compared with the second grooves 62.

On the other hand, of the plurality of grooves formed side-by-side in each outer plate 41, the second grooves 62 are grooves disposed at both ends, or in other words, a groove with a first groove 61 disposed only on one side of that groove.

In the cross-sectional view of FIG. 5, the second grooves 62 are grooves with a circular-arc-shaped bottom and having a larger groove-width, as compared with the first grooves 61.

Giving the first grooves 61 and the second grooves 62 a circular-arc-shaped bottom reduces the occurrence of stress concentration since no angular sections are formed in the first grooves 61 and the second grooves 62, as compared with, for example, a case where the cross-sectional shape thereof is rectangular or trapezoidal.

In this embodiment, the first grooves 61 and the second grooves 62 are grooves that are formed by cutting using ball-end mills that correspond to the respective groove-widths, and the first grooves 61 and the second grooves 62 are formed in a single cutting process by using different ball-end mills.

The cross-sectional shape of the first grooves 61 and the second grooves 62 is not limited to the aforementioned shape with a circular-arc-shaped bottom, and the cross-sectional shape thereof may alternatively be rectangular or trapezoidal; it is not particularly limited.

If the cross-sectional shape of the first grooves 61 and the second grooves 62 is rectangular or trapezoidal, the channel areas of the first channels 51 and the second channels 52 formed by the first grooves 61 and the second grooves 62 can be readily increased, as compared with a case where the bottom is formed in a circular-arc shape.

The inner plates 42 each are a plate-like component disposed on the inner peripheral side of the combustion cylinder, and are composed of metal, an alloy, or the like having heat-resisting properties. The present embodiment is described as being applied to an example where the inner plate 42 is composed of a nickel-based alloy.

The inner plate 42 is diffusion-bonded, by brazing, to the surface, in which the first grooves 61 and the second grooves 62 are formed, of the corresponding outer plate 41, and covers the first grooves 61 and the second grooves 62 so as to form the first channels 51 and the second channels 52.

In the outer plate 41 of the upper panel 33U, the abutment sections 63 are areas formed between the second grooves 62 and the ends that face the right panel 33R and the left panel 33L, and are used as a welded section 64 between the upper panel 33U and the right panel 33R and a welded section 64 between the upper panel 33U and the left panel 33L.

Therefore, the abutment sections 63 are not provided with the first channels 51 and the second channels 52 used for cooling, and act as non-cooling areas.

Similarly, the abutment sections 63 provided in the right panel 33R, the left panel 33L, and the lower panel 33D are areas used for welding to the neighboring panels.

Although this embodiment is described as being applied to a can-type combustor 3, the embodiment is not limited to a can-type combustor 3 and may alternatively be applied to combustors of other types, such as an annular-type combustor; it is not particularly limited.

As shown in FIGS. 1 and 2, the turbine unit 4 generates a rotational driving force by receiving the high-temperature gas produced and supplied by the combustor 3, and transmits the generated rotational driving force to the rotating shaft 5.

As shown in FIG. 1, the rotating shaft 5 transmits the rotational driving force generated by the turbine unit 4 to the compressor 2 and the generator G.

The rotating shaft 5 may have a known configuration, but the configuration thereof is not particularly limited.

Next, a manufacturing method of the combustion cylinder 33, which is the feature of this embodiment, will be described.

When manufacturing a combustion cylinder 33, plate-like objects that form the upper panel 33U, the lower panel 33D, the right panel 33R, and the left panel 33L are first formed, and the combustion cylinder 33 is subsequently formed.

Specifically, first grooves 61 and second grooves 62 are formed in a flat outer plate 41 by cutting. The first grooves 61 and the second grooves 62 are formed so as to be arranged side-by-side and also so that the distance between the neighboring grooves is uniform when the combustion cylinder 33 is formed.

On the other hand, the first grooves 61 and the second grooves 62 are not formed in the abutment sections 63.

When the first grooves 61 and the second grooves 62 are formed in the flat outer plate 41, an inner plate 42 is joined to the surface of the outer plate 41 having the first grooves 61 and the second grooves 62 formed therein, thereby forming a plate-like object.

Specifically, in the outer plate 41, a brazing material is disposed in areas, to be brought into contact with the inner plate 42, in the surface of the outer plate 41 having the first grooves 61 and the second grooves 62 formed therein, and the outer plate 41 and the inner plate 42 are disposed so as to sandwich the brazing material therebetween. Subsequently, while heating the outer plate 41, the inner plate 42, and the brazing material, the outer plate 41 and the inner plate 42 are pressed by a pressing device in a direction in which they come closer to each other so as to become diffusion-bonded to each other.

By joining the inner plate 42 to the outer plate 41 in this manner, the first channels 51 and the second channels 52 are formed. In other words, the first channels 51 are formed by the first grooves 61 and the inner plate 42, and the second channels 52 are formed by the second grooves 62 and the inner plate 42.

The brazing material used may have the same composition as that of the outer plate 41 and the inner plate 42, and is not particularly limited.

Once the plate-like objects are formed, the flat plate-like objects are subsequently press-molded, thereby forming the upper panel 33U, the lower panel 33D, the right panel 33R, and the left panel 33L.

Subsequently, the upper panel 33U, the lower panel 33D, the right panel 33R, and the left panel 33L are tentatively assembled by being disposed as if the combustion cylinder 33 were formed.

After the tentative assembly, the upper panel 33U and the right panel 33R, the right panel 33R and the lower panel 33D, and the lower panel 33D and the left panel 33L are joined to each other by laser welding so as to form the combustion cylinder 33.

For example, an abutment section 63 of the upper panel 33U and an abutment section 63 of the right panel 33R are laser-welded to each other, thereby joining the upper panel 33U and the right panel 33R together.

Subsequently, accessory components for the combustion cylinder 33 are attached to the combustion cylinder 33, and the combustion cylinder 33 is completed by being given a thermal barrier coating.

Next, the general operation in the gas turbine 1 having the above-described configuration will be described.

As shown in FIG. 1, in the gas turbine 1, the compressor 2 is rotationally driven to take in the atmosphere (i.e., air). The atmosphere taken in is compressed by the compressor 2 and is sent towards the combustor 3.

The compressed air flowing into the combustor 3 is mixed, inside the combustion cylinder 33, with fuel supplied into the combustor 3 from the outside. The air-fuel mixture is combusted in the combustor 3 so that high-temperature gas is produced by the combustion heat.

The high-temperature gas produced in the combustor 3 travels through the inside of the combustion cylinder 33 so as to be supplied to the turbine unit 4 disposed downstream thereof. The turbine unit 4 is rotationally driven by the high-temperature gas, and the rotational driving force is transmitted to the rotating shaft 5. The rotating shaft 5 transmits the rotational driving force extracted in the turbine unit 4 to the compressor 2 and the generator G.

Next, cooling by the first channels 51 and the second channels 52 according to this embodiment will be described.

The first channels 51 and the second channels 52 in the upper panel 33U, the lower panel 33D, the right panel 33R, and the left panel 33L that constitute the combustion cylinder 33 are supplied with vapor, which is cooling fluid, from the outside.

The vapor flows through the first channels 51 and the second channels 52 so as to cool the upper panel 33U, the lower panel 33D, the right panel 33R, and the left panel 33L constituting the combustion cylinder 33, thereby protecting these panels from the combustion heat and the heat of the high-temperature gas.

The vapor used for cooling may be recovered from the first channels 51 and the second channels 52 or may be supplied to the turbine unit 4 together with the high-temperature gas; it is not particularly limited.

Next, temperature analysis results in the abutment sections 63 and the welded sections 64 of the upper panel 33U and the like in this embodiment will be described with reference to FIGS. 6 and 7.

Figure 6:
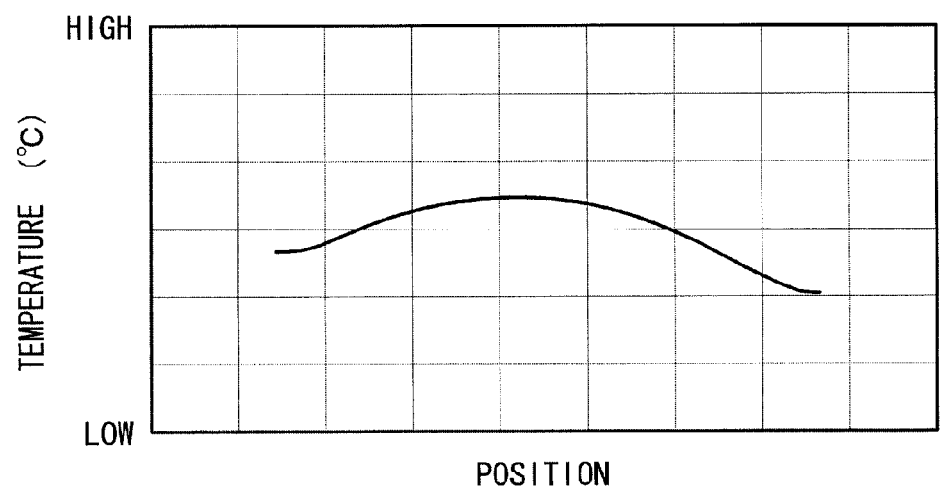
FIG. 6 is a graph for explaining analysis results of the temperature distribution in abutment sections and welded sections of an upper panel and the like according to the first embodiment.

FIG. 6 is a graph for explaining analysis results of the temperature distribution in the abutment sections and the welded sections of the upper panel and the like according to this embodiment. FIG. 7 is a graph for explaining analysis results of the temperature distribution in the abutment sections and the welded sections of the upper panel and the like in which the channels all have the same channel width.

FIG. 6 is a graph illustrating the metal-temperature distribution in an outer plate 41 when the channel width of the second channels 52 is about 1.8 times greater than that of the first channels 51 and the channel depth is the same. The ordinate shows the metal temperature in the outer plate 41, whereas the abscissa shows a position in a direction orthogonal to the abutment sections 63 and the welded sections 64, and substantially the middle of the graph corresponds to an area where neighboring panels are butted against each other.

Figure 7:
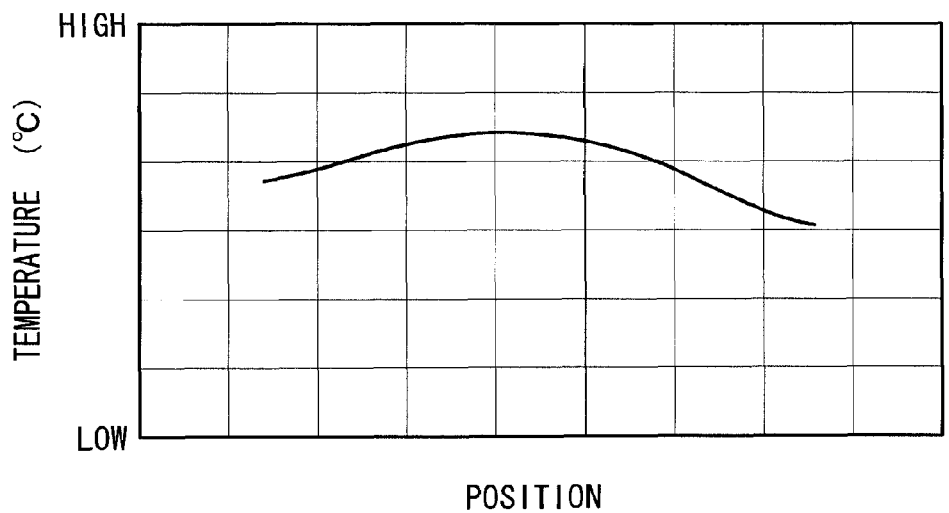
FIG. 7 is a graph for explaining analysis results of the temperature distribution in the abutment sections and the welded sections of the upper panel and the like in which channels all have the same channel width.

As is apparent from the graphs shown in FIGS. 6 and 7, the metal temperature in the outer plate 41 is at a maximum in the middle of the graph, which is the area where the neighboring panels are butted against each other and is a non-cooling area. The metal temperature in the outer plate 41 decreases from there towards areas where the first channels 51 and the second channels 52 are formed (towards the right side and the left side in the graphs in FIGS. 6 and 7).

Furthermore, when comparing the graph (FIG. 7) regarding the upper panel 33U and the like having only the first channels 51 formed therein with the graph (FIG. 6) regarding the upper panel 33U and the like having the first channels 51 and the second channels 52 formed therein, it is apparent that the metal temperature in the outer plate 41 is lower overall in the case of this embodiment (FIG. 6).

Next, a change in the metal temperature and a change in stress occurring in the plate-like object, such as the upper panel 33U, when the channel-width dimension of the first channels 51 and the like formed in the plate-like object is changed will be described with reference to FIGS. 8 and 9.

Figure 8:
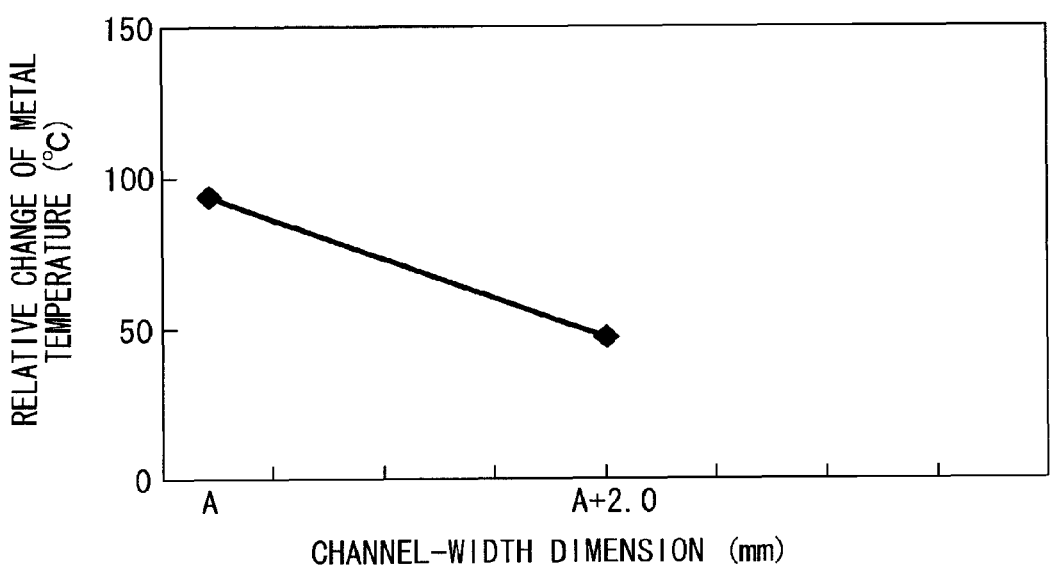
FIG. 8 is a graph for explaining the relationship between the channel-width dimension in a plate-like object having the channels formed therein, such as the upper panel, and the metal temperature in the plate-like object.

FIG. 8 is a graph for explaining the relationship between the channel-width dimension in the plate-like object having channels formed therein, such as the upper panel, and the metal temperature in the plate-like object. In FIG. 8, the abscissa shows the groove width, whereas the ordinate shows the metal temperature of the plate-like object. FIG. 9 is a graph for explaining the relationship between the channel-width dimension in the plate-like object having channels formed therein, such as the upper panel, and stress in the plate-like object. In FIG. 9, the abscissa shows the groove width, whereas the ordinate shows stress acting on the plate-like object.

As shown in FIG. 8, when the channel-width dimension increases, or in other words, the width dimension of the grooves that form the channels increases, the metal temperature of the plate-like object having the channels formed therein decreases. Specifically, it is apparent from the graph in FIG. 8 that, when the metal temperature of the plate-like object is slightly lower than 100° C. in the case where the channel-width dimension is A mm, the metal temperature of the plate-like object decreases to about 50° C. if the channel-width dimension is increased to A+2 mm. In other words, it is apparent from FIG. 8 that the metal temperature decreases by about 46° C.

Figure 9:
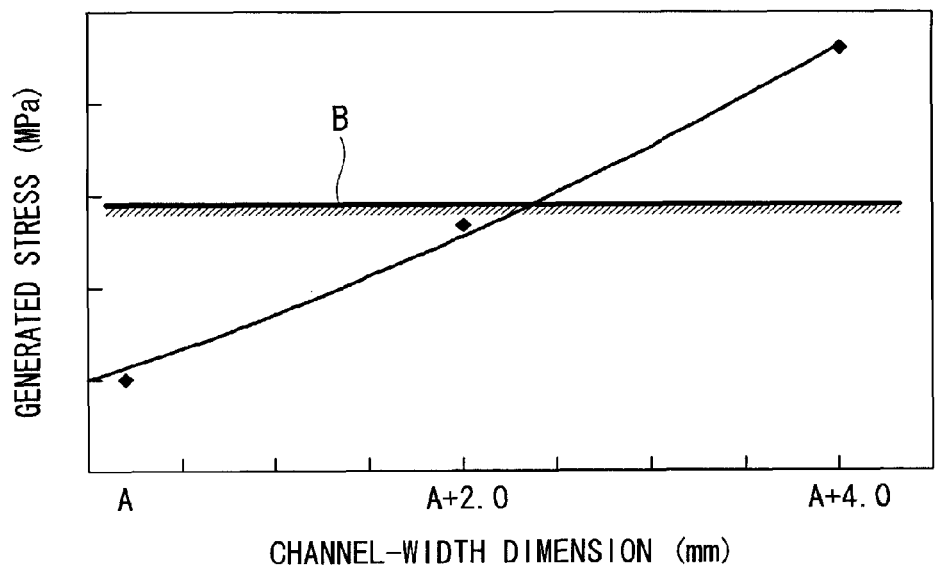
FIG. 9 is a graph for explaining the relationship between the channel-width dimension in the plate-like object having the channels formed therein, such as the upper panel, and stress in the plate-like object.

When the channel-width dimension is increased, not only does the metal temperature of the plate-like object decrease, as mentioned above, but also the structural rigidity (strength) of the plate-like object decreases, as shown in FIG. 9. Specifically, it is apparent from the graph in FIG. 9 that, when a value of stress acting on the plate-like object in the case where the channel-width dimension is A mm is lower than a limit value B of stress in the plate-like object, the value of stress acting on the plate-like object approaches the limit value B as the channel-width dimension is increased to A+2 mm, and moreover, the value of stress acting on the plate-like object exceeds the limit value B as the channel-width dimension is increased to A+4 mm.

In the case shown in FIGS. 8 and 9, it is apparent that the groove-width dimension be preferably set at about A+1.8 mm so as to lower the metal temperature of the plate-like object and to maintain the structural rigidity of the plate-like object.

With the above configuration, by increasing the width dimension of the second channels 52 adjacent to the abutment sections 63, that is, the dimension in the direction in which the first channels 51 and the second channels 52 are arranged, degradation in the cooling performance in the upper panel 33U and the like welded at the abutment sections 63 can be suppressed.

Specifically, by making the width dimension of the second channels 52 in the vicinity of the abutment sections 63 greater than the width dimension of other channels, the cooling performance achieved by the channels in the vicinity of the abutment sections 63 becomes higher than the cooling performance achieved by the first channels 51. Therefore, by disposing the second channels 52 with the greater width dimension adjacent to the abutment sections 63 where the cooling performance tends to deteriorate because of the inability to dispose channels in the vicinity thereof, degradation in the cooling performance in the vicinity of the abutment sections 63 of the upper panel 33U and the like can be suppressed.

Furthermore, since the second channels 52 adjacent to the abutment sections 63 extend along the abutment sections 63, the channels are prevented from being blocked even if the upper panel 33U and the like are welded at the abutment sections 63, thereby eliminating the need for forming grooves by machining the welded sections of the upper panel 33U and the like, for example, by cutting the welded sections by grinding, as in the invention set forth in the Publication of Japanese Patent No. 3831638. Therefore, the time required for manufacturing the gas-turbine combustor 3 by using the upper panel 33U and the like can be shortened, and deterioration of the working environment can be prevented.

After forming the first grooves 61 and the second grooves 62 in the outer plate 41, the inner plate 42 is joined to the outer plate 41 so as to block the openings of the first grooves 61 and the second grooves 62 by using the inner plate 42, thereby forming the upper panel 33U or the like having the first channels 51 and the second channels 52.

Therefore, the groove width, which is a groove dimension in the direction in which the first grooves 61 and the second grooves 62 are arranged, becomes the width dimension of the first channels 51 and the second channels 52, thereby allowing for easy adjustment of the channel-width dimension. Likewise, the groove depth, which is a groove dimension of the first grooves 61 and the second grooves 62 in the thickness direction of the outer plate 41, becomes the depth dimension of the first channels 51 and the second channels 52, thereby allowing for easy adjustment of the channel-depth dimension.

Modification of First Embodiment

Next, a modification of the first embodiment of the present invention will be described with reference to FIG. 10.

The basic configuration of a gas turbine of this modification is similar to that of the first embodiment, but the configuration of the upper panel and the like differs from that in the first embodiment. Therefore, the description of this embodiment will be directed only to the configuration of the upper panel and the like with reference to FIG. 10, and descriptions of other components will be omitted.

Figure 10:
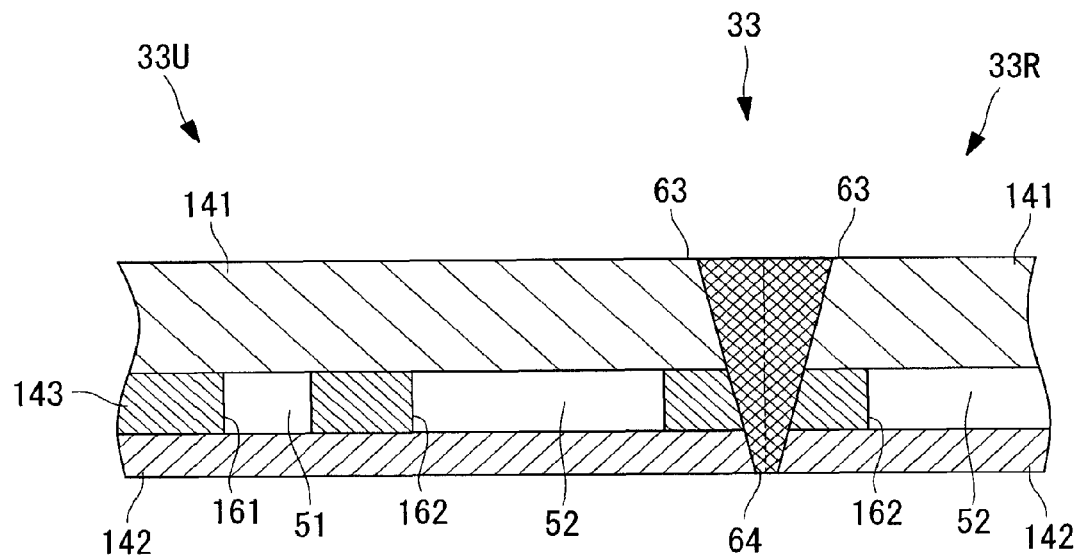
FIG. 10 is a cross-sectional view for explaining the configuration of a combustion cylinder according to a modification of the first embodiment of the present invention.

FIG. 10 is a cross-sectional view for explaining the configuration of a combustion cylinder according to the modification of this embodiment.

Components similar to those in the first embodiment are given the same reference numerals, and descriptions thereof will be omitted.

As shown in FIG. 10, the upper panel 33U, the lower panel 33D, the right panel 33R, and the left panel 33L constituting the combustion cylinder 33 of this modification are each provided with an outer plate (second plate) 141, an inner plate (second plate) 142, and an intermediate plate (first plate) 143.

The outer plate 141 is a plate-like component disposed on the outer peripheral side of the combustion cylinder 33, and is composed of metal, an alloy, or the like having heat-resisting properties. The present embodiment is described as being applied to an example where the outer plate 141 is composed of a nickel-based alloy.

The inner plate 142 is a plate-like component disposed on the inner peripheral side of the combustion cylinder 33, and is composed of metal, an alloy, or the like having heat-resisting properties. The present embodiment is described as being applied to an example where the inner plate 142 is composed of a nickel-based alloy.

The intermediate plate 143 is a plate-like component disposed between the outer plate 141 and the inner plate 142, and is composed of metal, an alloy, or the like having heat-resisting properties. The present embodiment is described as being applied to an example where the intermediate plate 143 is composed of a nickel-based alloy.

In the intermediate plate 143, first slits (slits) 161 and second slits (slits) 162 that respectively form the first channels 51 and the second channels 52, through which a cooling medium, such as vapor, flows, are formed side-by-side.

Of the plurality of slits formed side-by-side in the intermediate plate 143, a first slit 161 is a slit that is disposed on the inner side other than both ends, or in other words, a groove with a first slit or slits 161 or a second slit 162 disposed on both sides of that slit.

In the cross-sectional view of FIG. 10, the first slits 161 are grooves having a smaller groove-width, which is a dimension in the direction in which the first slits 161 and the second slits 162 are arranged (left-right direction in FIG. 10), as compared with the second slits 162.

On the other hand, of the plurality of grooves formed side-by-side in the intermediate plate 143, the second slits 162 are slits disposed at both ends, or in other words, a groove with a first slit 161 disposed only on one side of that slit.

In the cross-sectional view of FIG. 10, the second slits 162 are grooves having a larger slit-width, as compared with the first slits 161.

Next, a manufacturing method of the upper panel 33U and the like constituting the combustion cylinder 33, which is the feature of this modification, will be described.

First, the first slits 161 and the second slits 162 are formed in a flat intermediate plate 143 by cutting. The first slits 161 and the second slits 162 are formed so that they are arranged side-by-side, or in other words, so that the intermediate plate 143 is made into a comb-like shape, and also so that the distance between the neighboring slits is uniform when the combustion cylinder 33 is formed.

On the other hand, the first slits 161 and the second slits 162 are not formed in the abutment sections 63.

When the first slits 161 and the second slits 162 are formed in the flat intermediate plate 143, an outer plate 141 and an inner plate 142 are joined thereto so as to sandwich the intermediate plate 143 therebetween. Subsequently, an area corresponding to the base of the comb teeth of the intermediate plate 143 formed into a comb-like shape is cut off so that the first channels 51 and the second channels 52 are formed, thereby forming a plate-like object constituting the upper panel 33U or the like.

With the above configuration, by forming the first slits 161 and the second slits 162 side-by-side in a comb-teeth pattern in the intermediate plate 143 and joining the outer plate 141 and the inner plate 142 thereto so as to sandwich the intermediate plate 143 therebetween, an upper panel 33U or the like having first channels 51 and second channels 52 can be formed.

Therefore, the slit width, which is a width dimension in the direction in which the first slits 161 and the second slits 162 are arranged, becomes the width dimension of the first channels 51 and the second channels 52, thereby allowing for easy adjustment of the width dimension of the first channels 51 and the second channels 52. Likewise, the thickness of the intermediate plate 143 becomes the depth dimension of the first channels 51 and the second channels 52, thereby allowing for easy adjustment of the depth dimension of the first channels 51 and the second channels 52.

What is claimed is:

1. A plate-like-object manufacturing method comprising:
a step of forming a plate-like object by stacking a plurality of plates and arranging a plurality of channels, through which a cooling medium flows, side-by-side between the plurality of plates; and
a step of arranging a plurality of the plate-like objects side-by-side in a direction in which the channels are arranged, butting the plurality of plate-like objects against each other, and performing welding at an abutment section, the plurality of the plate-like objects forming a portion of a combustor,
wherein the channels adjacent to the abutment section, which are arranged with a predetermined interval from the welding in the direction in which the channels are arranged, extend along the abutment section and have a greater dimension in the direction in which the channels are arranged, as compared with that of other channels.

2. The plate-like-object manufacturing method according to claim 1, wherein the step of forming the plate-like object comprises:
a step of forming a plurality of grooves side-by-side in one surface of one plate; and
a step of forming the plate-like object and the plurality of channels by joining another plate to the one surface of the one plate.

3. The plate-like-object manufacturing method according to claim 1, wherein the step of forming the plate-like object comprises:
a step of forming a plurality of slits side-by-side in a first plate; and
a step of forming the plate-like object and the plurality of channels by joining second plates to one surface and another surface of the first plate.

4. A gas-turbine combustor comprising:
a nozzle unit that emits fuel; and
a cylindrical object that mixes and combusts air and the emitted fuel therein,
wherein the cylindrical object comprises the plate-like objects manufactured by the plate-like-object manufacturing method according to claim 1.

5. A gas turbine comprising:
a compressor that compresses air;
the gas-turbine combustor according to claim 4 that produces combustion gas by mixing and combusting compressed air supplied from the compressor and fuel supplied from the outside;
a turbine unit that converts a portion of energy included in the combustion gas into a rotational driving force; and
a rotating shaft that transmits the rotational driving force from the turbine unit to the compressor.

6. Plate-like objects comprising:
one plate-like object having a plurality of channels arranged side-by-side therein;
another plate-like object having a plurality of channels arranged side-by-side therein, the plurality of channels being arranged side-by-side in one direction relative to the one plate-like object; and
a welded section at which the one plate-like object and the other plate-like object are joined together,
wherein the channels adjacent to the welded section for the one plate-like object and the other plate-like object, which are arranged with a predetermined interval from the welded section in the direction in which the channels are arranged, and extending along the welded section have a greater dimension in the direction in which the channels are arranged, as compared with that of other channels, and
wherein the one plate-like object and the another plate like object form a portion of a combustor.

7. A gas-turbine combustor comprising:
a nozzle unit that emits fuel; and
a cylindrical object that mixes and combusts air and the emitted fuel therein, wherein the cylindrical object comprises the plate-like objects according to claim 4.

8. A gas turbine comprising:
a compressor that compresses air;
the gas-turbine combustor according to claim 7 that produces combustion gas by mixing and combusting compressed air supplied from the compressor and fuel supplied from the outside;
a turbine unit that converts a portion of energy included in the combustion gas into a rotational driving force; and
a rotating shaft that transmits the rotational driving force from the turbine unit to the compressor.

* * * * *